United States Patent Office 2,863,788
Patented Dec. 9, 1958

2,863,788

AN AQUEOUS PIGMENT-AMINOPLAST RESIN EMULSION AND METHOD OF TREATING FABRIC THEREWITH

Richard D. Vartanian, Bound Brook, and William F. Herbes, Somerville, N. J., assignors to American Cyanamid Company, New York, N. Y., a corporation of Maine No Drawing. Application November 17, 1954
Serial No. 469,562

8 Claims. (Cl. 117—33.3)

This invention relates to the printing of materials and more particularly, to compositions which may be employed to print on textile fabrics such as wool, cotton, nylon, etc., and the product obtained thereby.

Conventional textile printing is ordinarily done with water solutions of dyestuffs containing water-soluble thickening agents in sufficient quantity to retard spreading of the color on the fabric after printing. The dyestuff is fixed onto the fabric by some chemical process and the thickening agent is then washed out of the fabric.

This method has not been satisfactory for use with photogravure cylinders or extremely fine mill and die engravings because such pastes spread on the fabric after printing and result in blurred designs.

The emulsification of oils in these printing pastes gives a modified composition which shows less tendency to spread on the fabric and produces a sharper print. It is a disadvantage of such emulsions, however, that if the pigment is present in the water phase it tends to migrate into the oil phase and may eventually result in a breakdown of the emulsion. This migration of the pigment into the oil phase is known as "flushing," and even though it does not progress to the point of completely destroying the emulsion, the effect will show up on the print as a weak, dull or specky color.

Flushing may be prevented by dispersing the pigment in the oil-soluble phase of the emulsion, but such a step causes manufacturing difficulties due to the fact that most pigments are precipitated from an aqueous solution and recovered as a wet press cake. Dispersion of the wet press cake in an oil-soluble solvent is both time-consuming and expensive.

We have been able to improve emulsion stability and print strength in the printing compositions of the present invention without dispersing the press cake in an organic solvent by suspending the pigment in a water-dispersible heat-convertible resinous aminoplast. Our printing compositions are water-in-oil emulsions in which both the pigment and the resin binder are associated with the water phase. The improvement in our new printing composition is at least partly due to the presence of a low molecular weight alcohol in the water phase. It is an advantage of such compositions that the products produced therefrom have improved dry cleaning resistance as the resin binder is not soluble in organic solvents.

This advantage makes our printing composition particularly well adapted to bonding a heat-reflective leafing metallic powder to one surface of a lightweight fabric. Such coated fabrics show a decreased infrared transmission and have found wide commercial acceptance as linings for coats and other wearing apparel where the combination of warmth and light weight is greatly desired.

One application of our invention is to produce a fabric coated on one side that will pass the following rigid specifications: (1) Infrared transmission less than 10% of the uncoated fabric; (2) Good hand—coated fabric should retain flexibility; Stiffness of the coated fabric, as measured by the Pierce Stiffness test, should not be greater than 60% of the uncoated fabric; (3) No strike-through —fabrics coated on one side only; (4) Excellent dry cleaning characteristics—the increase in infrared transmission as the result of dry cleaning should not be greater than 20% of the uncoated fabric; (5) Excellent crock resistance—firm bonding of reflective pigment to the fabric—no worse than Class 3 by the standard AATCC testing method; and (6) Light weight—about 0.25–2.5 grams of metallic pigment per square yard.

Another object of this invention is a leafing metallic powder printing base which when emulsified and printed on a fabric will result in a product as described above.

The present invention is by no means limited to this particular application, however, as we have found that the present compositions give a better hand and a brighter color with organic pigments than do conventional emulsions which have the resin in the oil phase. It is a further advantage of the present compositions that they may contain less flammable solvent than was required heretofore. In earlier coating emulsions, a certain amount of solvent was necessary to hold the oil-soluble resins in solution. In the present composition the only purpose of these solvents is to control the viscosity of the printing paste and such solvents may be added only in the quantity required to obtain that particular result.

The predominant resin in our printing base in a water-dispersible amino plastic of the urea or triazine type. We particularly prefer to use trimethylol melamine which has been partially etherified with methyl alcohol. Similarly, etherified dimethylol urea may also be used. Such resins are stable indefinitely in aqueous solutions, but may be readily polymerized by heating in the presence of an acid catalyst.

It is an important aspect of the emulsions of our invention that the pigment which can be used includes many kinds of pigments. They include inorganic pigments such as ultramarine, carbon black, and metallic powders and organic pigments such as azo pigments, vat pigments and phthalocyanine pigments. Certain of these pigments, notably the metallic powders, cannot be used in aqueous emulsions which have high pH's. The reason for this is the reactivity of some of the metals, as e. g. aluminum, with strong bases to evolve hydrogen. A practical limit of pH to prevent this is a pH of 9.0. Below this limit, the emulsions are quite stable, even when a metallic pigment is present. Consequently, the pigmented resinous composition of our invention is limited to pH of 9 or lower. The pressure of a water-soluble aminoplast in the compositions of our invention prevent the use of acid conditions under which the aminoplast is precipitated. Consequently, the pH should be above 6. Below 6, the resin will have no storage stability.

The control of the pH of the compositions of our invention is affected by several factors, such as the pH of the aminoplast resin and the natural pH of the pigments. The aminoplast resins are prepared on the alkaline side, the preferred methylated trimethylol melamine being usually prepared at a pH of about 9. However, these resin solutions have the property of decreasing in pH as they age. Thus, a resin solution may have a pH of 9 when freshly prepared but this will rapidly decrease on standing over several weeks to a pH of about 7.8. Because of this aging phenomenon, it is very difficult to obtain two successive, similar compositions of exactly the same pH. However, as long as the pH is in the proper range, a satisfactory composition is obtained.

Another factor affecting the pH of the compositions is the pigment. Vat pigments, for example, are usually finished with an acid-pasting, followed by washing. Contrariwise, azo pigments are coupled in alkaline solutions and carbon blacks often have an alkaline reaction. Consequently, the pH of the composition must be carefully checked to keep within the proper limits. The addition of small amounts of acids or bases may well be necessary at times to achieve proper control.

The amount of pigment present in our resin printing base may be approximately equal to the total resin solids. While we prefer an aminoplast resin solids-to-pigment ratio of about 1:1, it may be varied between 1:0.16 and 1:2. If the amount of pigment exceeds this limit, there is not sufficient binder to properly bind the pigment to the fabric and crocking tendencies increase. If the amount of resin exceeds this limit, the additional resin does not appreciably improve the adhesion of the pigment to the fabric, but results in poor hand and increases the weight and the cost of the coating.

It is an important advantage of the present invention that it is not necessary to prepare finished emulsions which would require the shipment of a product containing a considerable amount of water. On the contrary, the present invention may be applied to the production of a pigmented resin base containing little or no water which can be stored practically indefinitely and can be rapidly dispersed in a water-in-oil emulsion by the printer to form printing pastes of various strengths. It is a further advantage of the present invention that pastes thus prepared can be diluted by using suitable reducing emulsions so that different strengths of pigmentation can be obtained without departing from the desired consistency of the emulsion.

In general, it is desirable to effect dispersion of the resin print base (formation of a water-in-oil emulsion) with the aid of emulsifying agents because in this manner it is easy to prepare homogeneous emulsions with the printing base herein described and expensive equipment such as a colloid mill is not required. This invention is not limited, however, to the use of any particular emulsifying agent. In the following examples we have employed a styrenated alkyd resin for this purpose. The particular styrenated alkyd resin which we have preferred to use is a styrenated oil-modified glyceride of phthalic acid which contains 30–40% styrene and 20%–30% phthalic anhydride, the remainder being glycerine and natural oils such as castor and soya bean oils. The invention, however, is not limited to this composition since other alkyds made from dibasic acids such as fumaric acid, maleic acid, phthalic acid, terephthalic acid, succinic acid, and the like, reacted with polyhydric alcohols such as glycerine, glycol, penta erythritol, and the like, may be used. Modification of the alkyd by reaction with styrene and oils such as linseed oil, castor oil, soya bean oil, and the like is preferable in order to obtain the emulsion of our invention.

The printing paste that is obtained by reduction of the resin base is a water-in-oil emulsion in which the inner aqueous droplets have a size of less than 50 microns. When textile fabrics are printed with the extremely fine water-in-oil emulsions of the present invention, uniform coatings are obtained, but the minute droplets of water are so uniformly separated by the dispersing medium that on drying, the resin does not tend to bridge from fiber to fiber and produce stiff material having the feel of a painted fabric, but instead appears to coat individual fibers so that the printing or coating material is still sufficiently flexible to be used for all normal purposes and does not have a harsh or unpleasant hand.

The viscosity of the print paste will be determined to a great extent by the ratio of water to water-immiscible organic liquid. This enables the printer to use various printing bases and properly control the viscosity of the printing paste in accordance with the type of fabric being coated and the character of engraving on the printing roll. The consistency of the emulsion should be such that the film produced does not strike through or completely surround the individual fibers, but is confined largely to the portions of the fibers adjacent to the printed side.

Since the present invention does not depend on any apparent chemical reaction with the material coated or physical or chemical affinity of the pigment therefor, it is usable with success on a wide variety of materials. Thus, fabrics of glass, cotton, rayon, pigmented rayon, cellulose acetate, saponified acetate, silk, wool and other basic nitrogenous fibers or cellulosic fibers may be employed. The invention may also be used in coating paper which may be sized or unsized. The fact that the process of the present invention is substantially independent of the nature of the surface to which the coating is to be applied makes its field of usefulness very wide and puts an important tool into the hand of the printer as well as other technologists.

After the fabric is printed it may be dried and finished in accordance with the usual practice. The emulsions of this invention contain resins which may be readily rendered insoluble on the fabric after being applied thereto by heating the fabric to a temperature of approximately 250–400° F., depending upon the heat resistance of the fabric and the total curing time. Some mills have driers which generally heat the fabric to this temperature, in which event the printed coating is insolubilized without the necessity of a separate intermediate drying operation.

The reason for the improved results obtained has not been completely determined and the present invention is not intended to be limited to any theory of action; however, we have found that the presence of at least 15% of an alcohol of less than 4 carbon atoms in the print base greatly increases the print strength of the final emulsion. At least one factor is the increased emulsion stability imparted to the system by the alcohol which results in a better distribution of pigment over the print surface. Another effect may be the decreased penetration obtained with the emulsions of the present invention. The pigment does not penetrate into the fiber but is widely distributed over the entire surface and appears to be fastened to the individual fibers as overlapping particles. This type of distribution of the pigment on the surface should theoretically result in greater printing strength, since pigment particles beneath the surface are not effective in reflecting light.

Another reason for the necessity of including the alcohol in the aqueous phase is the prevention of explosive hazards. It has been found that some of the leafing metallic pigments, aluminum for example, will react slowly with water to generate hydrogen. The inclusion of a small percentage of a low molecular weight alcohol prevents this.

The invention will be described in detail in conjunction with a number of specific examples which illustrate various resins and resin-to-pigment ratios. In the following examples, the parts represent parts by weight. Examples 1 through 10 describe the production of a print base. Example 11 describes an aqueous pigment dispersion; Example 12 describes an emulsifying agent, and Examples 13 through 28 describe the emulsification of the printing base to form a paste of the correct consistency for the printing process.

EXAMPLE 1

| | |
|---|---|
| Aluminum powder | parts__ 15 |
| Methanol | do____ 15 |
| Melamine resin (80%) | do____ 70 |
| Resin:pigment | 1:0.27 |

In all the examples, the melamine resin was a methylated methylol melamine in which from 65% to 75% of the available methylol groups were methylated and approximately 3.3 mols of formaldehyde were combined with each mol of melamine. This resin had a viscosity of X to Y at 80% solids in aqueous methanol. The aluminum powder in all examples was a fine aluminum lining powder and was dispersed in the resin solution by simple stirring. The pH was about 7.8.

EXAMPLE 2

| | | |
|---|---|---|
| Aluminum powder | parts | 25 |
| Propanol | do | 25 |
| Melamine resin (80%) | do | 50 |
| Resin:pigment | | 1:0.625 |
| pH | | About 7.2 |

EXAMPLE 3

| | | |
|---|---|---|
| Ultramarine blue | parts | 60 |
| Methanol | do | 200 |
| Water | do | 20 |
| Melamine resin (80%) | do | 120 |
| Resin:pigment | | 1:0.625 |
| pH | | About 8.4 |

EXAMPLE 4

| | | |
|---|---|---|
| Aluminum powder | parts | 40 |
| Methanol | do | 35 |
| Melamine resin (80%) | do | 25 |
| Resin:pigment | | 1:2 |
| pH | | About 6.8 |

EXAMPLE 5

| | | |
|---|---|---|
| Bronze powder | parts | 32 |
| Methanol | do | 3 |
| Melamine resin (80%) | do | 65 |
| Resin:pigment | | 1:0.615 |
| pH | | About 7.6 |

The melamine resin used in this example was identical with that of Example 1.

EXAMPLE 6

| | | |
|---|---|---|
| F-dichloro yellow (p-dichlorobenzidine coupled with acetoacet-o-toluidide) | parts | 65 |
| Water | do | 205 |
| Ethanol | do | 100 |
| Melamine resin (80%) | do | 130 |
| Resin:pigment | | 1:0.62 |
| pH | | About 7.2 |

The melamine resin used in this example was identical with that of Example 1.

EXAMPLE 7

| | | |
|---|---|---|
| Vat yellow GC (Prototype No. 9) | parts | 65 |
| Water | do | 205 |
| Isopropanol | do | 100 |
| Melamine resin (80%) | do | 130 |
| Resin:pigment | | 1:0.62 |
| pH | | About 6.7 |

The melamine resin used in this example was identical with that of Example 1.

EXAMPLE 8

| | | |
|---|---|---|
| Carbon black | parts | 65 |
| Water | do | 155 |
| Methanol | do | 150 |
| Melamine resin (80%) | do | 130 |
| Resin:pigment | | 1:0.62 |
| pH | | About 8.5 |

EXAMPLE 9

| | | |
|---|---|---|
| Aluminum powder | parts | 25 |
| Methanol | do | 35 |
| Bis methoxy methylol urea | do | 40 |
| Resin:pigment | | 1:0.625 |
| pH | | About 6.9 |

The methylated urea formaldehyde resin used in the above example was readily soluble in both water and methanol.

EXAMPLE 10

| | | |
|---|---|---|
| Phthalocyanine blue | parts | 425 |
| Methanol | do | 1560 |
| Melamine resin | do | 850 |
| Resin:pigment | | 1:0.625 |
| pH | | About 7.0 |

The melamine resin and phthalocyanine blue were ground on a three-roll mill (four passes) and the methanol was then stirred in.

EXAMPLE 11

| | | |
|---|---|---|
| Copper phthalocyanine green | parts | 7.3 |
| Bentonite | do | 1.2 |
| Sodium salt of diaryl disulfonic acid | do | 0.9 |
| Terpine sulfonate | do | 0.4 |
| Triethanol amine | do | 0.3 |
| Water | do | 30.7 |
| Total | do | 40.8 |
| Pigment | percent | 18 |
| pH | | 8.1 |

The above aqueous pigment dispersion was used in the printing emulsion of Examples 14, 15, 16 and 17.

EXAMPLE 12

Reduction concentrate

An alkyd resin was used to aid in dispersing the resin bases described above. Sixty-four parts of a styrenated alkyd copolymer containing between 30–40% styrene and from 20–30% phthalic anhydride and having a Gardner-Holdt viscosity of W to $Z_1$ at 50% solids in a mixture of equal parts of mineral spirits and xylene, was diluted with 8 parts of xylene and stirred with a high speed mixer. Eight parts of ammonium sulfate were then dissolved in 20 parts of water and added to the styrene alkyd copolymer solution to form a water-in-oil emulsion. The ammonium sulfate has an acid reaction and its function is to accelerate the conversion of the aminoplast.

EXAMPLE 13

| | | |
|---|---|---|
| Pigment dispersion of Example 11 | parts | 40.5 |
| Water | do | 200.25 |
| Ethanol | do | 124.0 |
| Triethanol amine (30%) | do | .5 |
| Melamine resin (80%) | do | 7.25 |
| Reduction concentrate | do | 12.5 |
| Xylene | do | 17.5 |
| Mineral spirits | do | 97.5 |
| Pigment | percent | 1.45 |
| Resin:pigment | | 1:1.25 |
| pH | | About 7.9 |

In preparing the water-in-oil printing paste, the pigment dispersion was mixed with the melamine resin and diluted with water. The xylene, mineral spirits and reduction concentrate were then rapidly stirred during addition of the pigment dispersion to form a smooth emulsion. The print paste so obtained was applied to 80 x 80 bleached unmercerized cotton with an engraved stripe print roll.

EXAMPLE 14

| | | |
|---|---|---|
| Pigment dispersion of Example 11 | parts | 40.5 |
| Water | do | 200.0 |
| Propanol | do | 116.5 |
| Triethanol amine HCl (30%) | do | 1.0 |
| Melamine resin (80%) | do | 14.5 |
| Reduction concentrate | do | 12.5 |
| Xylene | do | 17.5 |
| Mineral spirits | do | 97.5 |
| Pigment | percent | 1.45 |
| Resin:pigment | | 1:0.63 |
| pH | | About 8.0 |

A print paste was obtained and applied by the method of Example 13.

EXAMPLE 15

| | | |
|---|---|---|
| Pigment dispersion of Example 11 | parts | 40.5 |
| Water | do | 200.0 |
| Isopropyl alcohol | do | 101.0 |
| Triethanol amine HCl (30%) | do | 2.0 |
| Melamine resin (80%) | do | 29.0 |
| Reduction concentrate | do | 12.5 |
| Xylene | do | 17.5 |
| Mineral spirits | do | 97.5 |
| Pigment | percent | 1.45 |
| Resin:pigment | | 1:0.32 |
| pH | | About 8.1 |

A print paste was mixed and applied by the method of Example 13.

EXAMPLE 16

| | | |
|---|---|---|
| Pigment dispersion of Example 11 | parts | 40.5 |
| Water | do | 170.5 |
| Ethanol | do | 100.0 |
| Triethanol amine HCl (30%) | do | 4.0 |
| Melamine resin (80%) | do | 58.0 |
| Reduction concentrate | do | 12.5 |
| Xylene | do | 17.5 |
| Mineral spirits | do | 97.5 |
| Pigment | percent | 1.45 |
| Resin:pigment | | 1:0.16 |
| pH | | About 8.2 |

Examples 13 through 16 illustrate variations in the resin-to-pigment ratio of the final printing paste. Prints from each example were tested for crocking and wash fastness. Every print was satisfactory in this respect.

EXAMPLE 17

| | | |
|---|---|---|
| Base of Example 6 | parts | 38.4 |
| Water | do | 333.5 |
| Triethanol amine HCl (30%) | do | 0.6 |
| Reduction concentrate | do | 12.5 |
| Xylene | do | 17.5 |
| Mineral spirits | do | 97.5 |
| Pigment | percent | 1 |
| pH | | About 7.8 |

A water-in-oil printing emulsion was prepared by mixing the xylene, mineral spirits and reduction concentrate in a low-speed Eppenbach mixer. In a second container the print base was mixed with the water and aqueous triethanol amine HCl. This aqueous solution was then slowly poured into the xylene mineral spirits with high-speed stirring. The printed fabric was dried at about 80° C. and cured for 5 minutes at about 150° C. The resulting fabric was commercially acceptable.

EXAMPLE 18

| | | |
|---|---|---|
| Base of Example 7 | parts | 38.4 |
| Water | do | 333.5 |
| Triethanol amine HCl (30%) | do | 0.6 |
| Reduction concentrate | do | 12.5 |
| Xylene | do | 17.5 |
| Mineral spirits | do | 97.5 |
| Pigment | percent | 1 |
| pH | | About 7.5 |

The above printing paste was applied to 80 x 80 bleached unmercerized cotton. The printed fabric was of satisfactory quality.

EXAMPLE 19

| | | |
|---|---|---|
| Base of Example 5 | parts | 93.7 |
| Water | do | 275.3 |
| Triethanol amine HCl (30%) | do | 3.5 |
| Reduction concentrate | do | 12.5 |
| Xylene | do | 17.5 |
| Mineral spirits | do | 97.5 |
| Pigment | percent | 6 |
| pH | | About 7.9 |

This printing paste was applied to an all-viscose lining and cured at 150° C. The infrared transmission was satisfactory and was not appreciably increased after repeated dry cleaning. The treated fabric had an excellent hand and drape and there was a minimum tendency toward crocking even after repeated dry cleaning.

EXAMPLE 20

| | | |
|---|---|---|
| Base of Example 2 | parts | 80.0 |
| Water | do | 280.0 |
| Triethanol amine HCl (30%) | do | 2.5 |
| Reduction concentrate | do | 12.5 |
| Xylene | do | 19.5 |
| Mineral spirits | do | 105.5 |
| Pigment | percent | 4 |
| pH | | About 7.9 |

This printing emulsion was prepared in the usual manner and applied to 60–40 wool rayon shirting. The pigment did not strike through to the back side of the fabric.

EXAMPLE 21

| | | |
|---|---|---|
| Color base of Example 2 | parts | 80.0 |
| Water | do | 180.0 |
| Triethanol amine HCl (30%) | do | 2.5 |
| Aqueous methyl cellulose (11%) | do | 100.0 |
| Reduction concentrate | do | 12.5 |
| Xylene | do | 19.5 |
| Mineral spirits | do | 105.5 |
| Pigment | percent | 4 |
| pH | | About 7.8 |

This printing emulsion was applied to an acetate warp rayon-filled fabric by means of a blotch roll on a printing machine. The fabric so obtained was resistant to crocking.

EXAMPLE 22

| | | |
|---|---|---|
| Color base of Example 4 | parts | 74.0 |
| Water | do | 253.0 |
| Triethanol amine HCl (30%) | do | 1.5 |
| Urea-formaldehyde resin (water-soluble) | do | 40.0 |
| Reduction concentrate | do | 12.5 |
| Xylene | do | 17.5 |
| Mineral spirits | do | 97.5 |
| Pigment | percent | 6 |
| pH | | About 7.3 |

The above printing emulsion was applied to nylon cloth by means of a pin pad or cover roll having 48 rows of 48 pins each per square inch, having a depth of 0.010 inch. The printed fabric so obtained was commercially acceptable.

EXAMPLE 23

| | | |
|---|---|---|
| Color base of Example 3 | parts | 67.0 |
| Water | do | 304.0 |
| Triethanol amine HCl (30%) | do | 1.2 |
| Reduction concentrate | do | 12.5 |
| Xylene | do | 17.5 |
| Mineral spirits | do | 97.5 |
| pH | | About 8.0 |

The above printing emulsion was applied to 80 x 80 bleached unmercerized cotton. A strong bright blue print was obtained, which showed excellent resistance to dry cleaning.

EXAMPLE 24

| | | |
|---|---|---|
| Base of Example 1 | parts | 100.0 |
| Water | do | 272.5 |
| Reduction concentrate | do | 12.5 |
| Xylene | do | 17.5 |
| Mineral spirits | do | 97.5 |
| Pigment | percent | 2 |
| pH | | About 7.8 |

A fabric printed with the above composition showed an excellent hand and very good dry cleaning properties.

EXAMPLE 25

| | | |
|---|---|---|
| Base of Example 2 | parts | 120.0 |
| Water | do | 252.5 |
| Reduction concentrate | do | 12.5 |
| Xylene | do | 17.5 |
| Mineral spirits | do | 97.5 |
| Pigment | percent | 6 |
| pH | | About 7.1 |

The above print paste was commercially satisfactory.

EXAMPLE 26

| | | |
|---|---|---|
| Base of Example 1 | parts | 200.0 |
| Water | do | 172.5 |
| Reduction concentrate | do | 12.5 |
| Xylene | do | 17.5 |
| Mineral spirits | do | 97.5 |
| Pigment | percent | 6 |
| pH | | About 7.7 |

This composition when printed on a fabric, imparted infrared reflecting properties that were not materially decreased after five dry cleanings.

EXAMPLE 27

| | | |
|---|---|---|
| Base of Example 8 | parts | 38.4 |
| Water | do | 333.5 |
| Triethanol amine HCl (30%) | do | 0.6 |
| Reduction concentrate | do | 12.5 |
| Xylene | do | 17.5 |
| Mineral spirits | do | 97.5 |
| Pigment | percent | 1 |
| pH | | About 8.3 |

Fabrics printed with the above composition exhibited exceptional dry cleaning resistance.

EXAMPLE 28

| | | |
|---|---|---|
| Base of Example 9 | parts | 80.0 |
| Water | do | 290.9 |
| Triethanol amine HCl (30%) | do | 1.6 |
| Reduction concentrate | do | 12.5 |
| Xylene | do | 17.5 |
| Mineral spirits | do | 97.5 |
| Pigment | percent | 4 |
| pH | | About 6.9 |

A printing emulsion obtained by mixing the above ingredients in the proportions indicated with a high-speed stirrer was applied to a 12-ounce wool gabardine. The infrared transmission of the coated fabric was less than 10 per cent of that exhibited by the untreated fabric. The printed fabric was more resistant to crocking than that of Example 20 above.

EXAMPLE 29

| | | |
|---|---|---|
| Print base of Example 10 | parts | 67.0 |
| Water | do | 304.0 |
| Triethanol amine HCl (30%) | do | 1.2 |
| Reduction concentrate | do | 12.5 |
| Xylene | do | 17.5 |
| Mineral spirits | do | 97.5 |
| pH | | About 7.6 |

The above printing paste was mixed according to the procedure of Example 13 and applied to 80 x 80 bleached unmercerized cotton. The blue print was much brighter than a control in which the print base of Example 10 had been reduced with water instead of methanol after grinding.

The final prints from the pastes described above are a good quality and show excellent definition. The printing emulsions may be allowed to stand for a considerable time before use and there is no reaction between pigment and vehicles, even though metallic pigments are present.

This application is a continuation-in-part of our previously filed application, Serial No. 241,702, filed August 13, 1951, now abandoned.

We claim:

1. A method of decreasing the infrared transmission of a fabric which comprises printing on one side of said fabric a water-in-oil emulsion which has associated in the discontinuous inner phase a leafing metallic pigment, and a water-soluble resin selected from the group consisting of methylated methylol urea and methylated methylol melamine resins and an alcohol of less than 4 carbon atoms, said dispersed phase being characterized by a pH between 6 and 9, the oil phase of said emulsion consisting of a hydrocarbon solvent free of aminoplast solids.

2. An emulsion of the water-in-oil type which comprises an inner discontinuous phase comprising a pigment dispersed in an aqueous solution of a resinous aminoplast selected from the group consisting of methylated methylol urea and methylated methylol melamine resins and an alcohol of less than 4 carbon atoms, said disperse phase being characterized by a pH between 6 and 9, and an outer continuous phase of a hydrocarbon solvent, said solvent being free of aminoplast solids.

3. The emulsion of claim 2 in which the said aminoplast is methylated trimethylol melamine.

4. The emulsion of claim 2 in which the said aminoplast is methylated methylol urea.

5. The emulsion of claim 3 in which the ratio of aminoplast solids to pigment is between 1:0.25 and 1:2.

6. Emulsion of claim 4 in which the ratio of aminoplast solids to pigment is between 1:0.25 and 1:2.

7. Emulsion of claim 5 in which the pigment is a leafing metallic powder, said composition containing methanol.

8. Emulsion of claim 6 in which the pigment is a leafing metallic powder, said composition containing methanol.

References Cited in the file of this patent

UNITED STATES PATENTS

| | | |
|---|---|---|
| 2,357,851 | Scheyer | Sept. 12, 1944 |
| 2,361,454 | Cassel | Oct. 31, 1944 |
| 2,626,251 | James et al. | Jan. 20, 1953 |
| 2,695,895 | Barnard et al. | Nov. 30, 1954 |